Feb. 3, 1959 — H. L. PHILIPPE — 2,872,150
FLUSHING VALVE
Filed Oct. 15, 1956
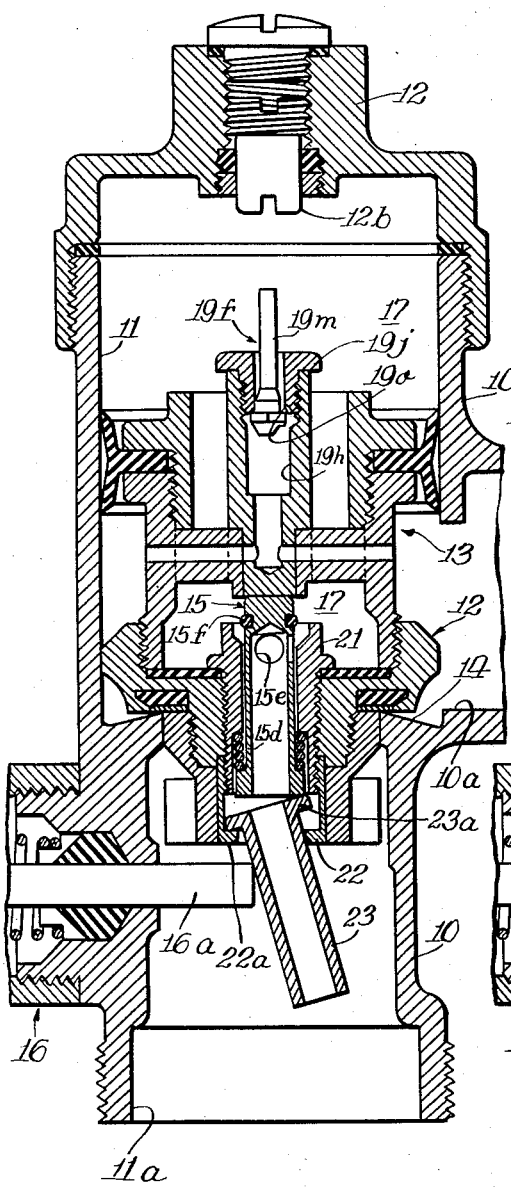
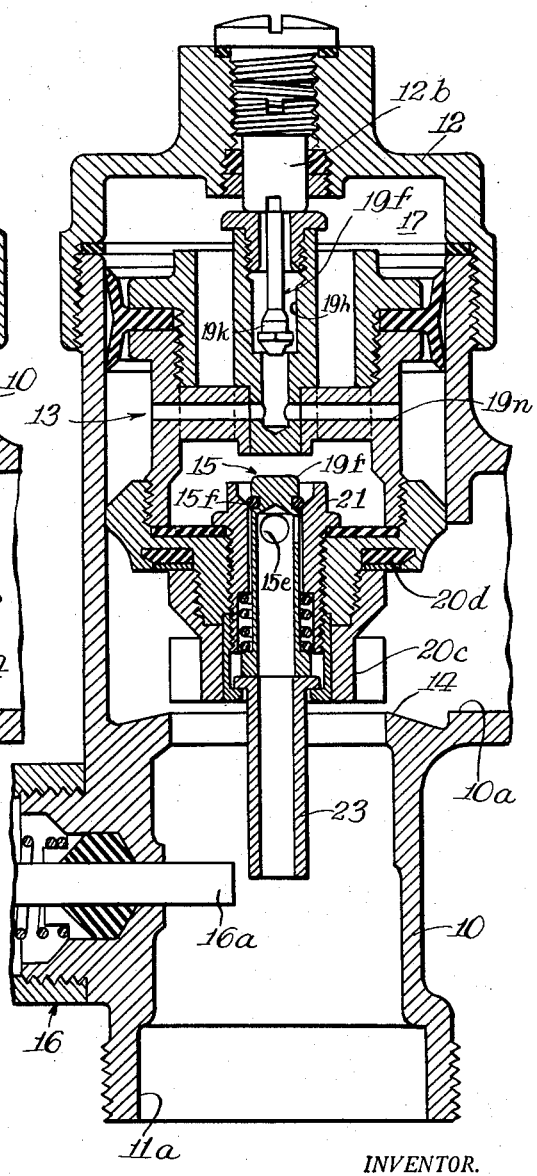
INVENTOR.
Howard L. Philippe United States Patent Office 2,872,150
Patented Feb. 3, 1959

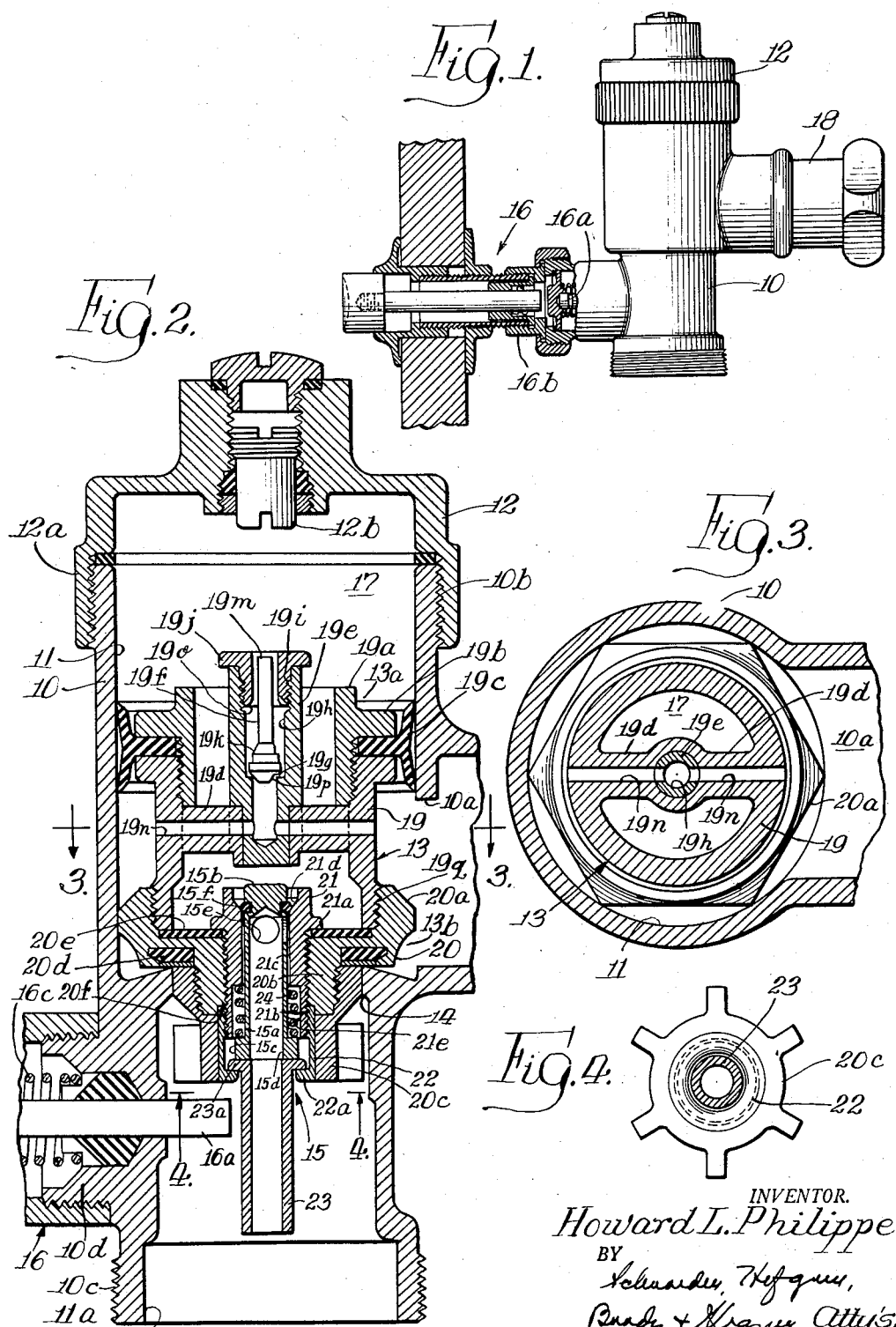

2,872,150

FLUSHING VALVE

Howard L. Philippe, Chicago, Ill., assignor to The Imperial Brass Manufacturing Company, a corporation of Illinois Application October 15, 1956, Serial No. 616,034

4 Claims. (Cl. 251—40)

This invention relates to a valve and in particular to a flushing valve.

In certain liquid transferring systems, such as sanitary systems, valves of the flush type are employed for delivering a predetermined quantity of liquid, such as water, from a supply line to a device, such as a toilet or urinal. One form of such a flush valve is that wherein the movable valve member is displaced from seated relationship across the outlet of the valve and moved to a fully opened position by the action of the liquid pressure, one side of the movable member being placed in communication with the outlet during this movement to provide a suitable pressure differential. To restore the movable valve member to the valve-closed position, this communication with the outlet is subsequently prevented, the liquid pressure then acting against this one side of the valve member to urge it to the closed position.

Applicant's invention is concerned with the means for controlling the movement of the movable valve member and comprehends a novel structure for allowing operation of the valve with effectively minimum manual pressure, whereby persons having little physical strength, such as small school children, may operate the valve.

The principal object of this invention is to provide a new and improved flushing valve.

Another object is to provide new and improved means on the movable valve member of a flushing valve for controlling the movement thereof.

A further object is to provide such controlling means which are operable by relatively small force to control the flow of liquid under substantial pressures through the valve.

Still another object is to provide such a valve operating means wherein a portion of such means are carried by the movable valve member itself and a portion is carried by the valve body member, with adjustable means being provided for limiting the movement of the movable valve member to control the total delivery through the valve during a flushing operation and arranged to prevent disassociation of the control means.

Other features and advantages will be apparent from the following description taken in connection with the accompanying drawings wherein:

Figure 1 is an elevation, with a portion thereof shown in diametric section, of a flush valve embodying the invention;

Figure 2 is an enlarged, fragmentary, diametric section thereof with the valve element shown in the valve-closed position;

Figure 3 is a section taken approximately along the line 3—3 of Figure 2;

Figure 4 is a section taken approximately along the line 4—4 of Figure 2;

Figure 5 is a section similar to that of Figure 2, but with the valve elements as arranged at the initiation of the valve-opening operation; and Figure 6 is a section similar to that of Figure 5 but with the valve elements arranged as immediately subsequent to the release of the manual operating means.

In the exemplary embodiment of the invention as disclosed in the drawings a flush valve is shown to comprise a body member 10 having a bore 11 therethrough arranged to extend vertically. The upper end of the bore is closed by suitable means herein disclosed as a threadedly connected closure 12. An inlet opening 10a is provided in the wall of the body member intermediate its ends and the lower end of bore 11 is unobstructed thereby forming an outlet opening 11a. To control flow of liquid such as water through the valve from inlet 10a to outlet 11a a movable main valve member 13 is disposed in bore 11 and arranged to seat on a suitable valve seat 14 on body member 10 between the inlet and outlet openings. For controlling the operation of valve member 13, a secondary or pilot valve member generally designated 15 is carried by the main valve member to be actuated by a suitable manual operating means 16 carried at the lower end of the body member.

As may best be seen in Figures 2, 5 and 6, the upper portion of bore 11 is substantially closed off by an upper member or portion 13a of the main valve member to form a chamber generally designated 17. Through suitable means, to be later described, restricted communication is had between chamber 17 and inlet 10a thereby allowing the pressure of the supply liquid, passed into chamber 17, to maintain the main valve member 13 in a valve-closed position, as seen in Figure 2 wherein a lower or seating portion 13b of the main valve member is urged forcibly into seating engagement with valve seat 14. To open the valve, secondary valve member 15 is moved to allow chamber 17 to have communication with outlet 11a thereby lowering the pressure in chamber 17 to below that at inlet 10a and allowing the liquid therein to pass therefrom and through outlet 11a so that the valve member 13 is automatically moved upwardly into the chamber, thereby removing seating portion 13b from the valve seat and allowing substantial flow of water through the valve from inlet 10a to outlet 11a.

The general structure comprehended by the invention having been described above, a more specific description thereof is made herefollowing. Body member 10 is preferably a tubular member and is exteriorly threaded at an upper end 10b for engagement with a depending, interiorly threaded flange 12a on closure 12. Suitable means 18 are arranged to extend from the portion of the body member surrounding inlet opening 10a for connection thereto of a water supply line (not shown). The lower end of body member 10 is exteriorly threaded at 10c surrounding outlet opening 11a for connection with a suitable discharge for outlet means (not shown). While valve seat 14 may be of any suitable construction it is herein disclosed as an integral annular shoulder formed in body member 10 adjacent the bottom of inlet opening 10a. Between valve seat 14 and threaded portion 10c, the body member is exteriorly provided with a radially extending boss 10d which is exteriorly threaded for connection thereto of the manual operating means 16.

As indicated above, main valve member 13 includes an upper portion 13a extending from the lower seating portion 13b to form the lower boundary of chamber 17. To this end the upper portion comprises a tubular member 19 interiorly threaded at the upper end for engagement with an exteriorly threaded, annular collar 19a having a radially outwardly extending flange 19b coacting with the upper end of the cylindrical member to retain clampedly an annular sealing ring 19c for sealing the upper portion 13a movably to the inner surface of the body member 10 in bore 11. Sealing ring 19c is preferably formed of a resilient material such as rubber and is provided with a Y-shaped cross section providing increased sealing effect while allowing ready vertical movement of the valve member through bore 11. As each of tubular member 19 and collar 19a is centrally open, chamber 17 extends downwardly therethrough to communicate freely with pilot valve 15.

Extending diametrically across the interior of tubular member 19 intermediate its ends is a support 19d, upstanding from the center of which is a tubular valve housing 19e in which is carried for limited movement a relatively small control valve 19f to seat normally on an annular shoulder 19g formed in an axial bore 19h in housing 19e. Bore 19h extends to the upper end of the housing where it is provided with an interiorly threaded portion 19i arranged to receive an exteriorly threaded bushing 19j serving as a means for retaining valve member 19f within bore 19h.

As best seen in Figures 2, 5 and 6, control valve 19f comprises a lower enlarged portion 19k and an elongated rod portion 19m extending freely through bushing 19j. To provide communication between inlet 10a and bore 19h, and thus with chamber 17, radially opposed passages 19n extend through support 19d and the lower end of housing 19e. This communication with chamber 17, however, is restricted by virtue of the necessity of liquid passing around control valve 19f in bore 19h, this space being relatively small. Further, when liquid flows upwardly through bore 19h it forces the valve member upwardly into abutment with bushing 19j the lower end of which is provided with a pair of diametrically arranged downwardly opening grooves 19o serving as the means for conducting liquid around valve portion 19k to chamber 17 when the control valve is in this upper position. The lower surface of valve portion 19k may be provided with a flat 19p providing a limited communication between chamber 17 and inlet 10a when the control valve is in the closed position of Figure 2, precluding formation of undesirable pressure conditions.

Seating portion 13b of the main valve member includes a ring 20 having an upstanding, peripheral collar portion 20a interiorly threaded for attachment to exteriorly threaded lower end 19q of cylindrical member 19. The exterior periphery of collar 20a may be polyhedral to provide tool engaging surfaces for use in tightening the ring on the cylindrical member and to permit communication between inlet 10a and passages 19n such as when collar 20a is disposed above the inlet, as seen in Fig. 6. A dependent, radially inner collar 20b of ring 20 is exteriorly threaded for engagement with an internally threaded nut member 20c serving to retain a sealing gasket 20d in place on ring 20 for seating engagement with valve seat 14. Extending radially across the upper surface of ring 20 to have its peripheral edge received between the ring and cylindrical member end 19q for effecting a seal therebetween is an annular washer 20e.

The valve seat of secondary pilot valve 15 comprises a tubular element 21 extending longitudinally through ring 20 and provided with an annular flange 21a adjacent its upper end arranged to have engagement with washer 20e. The lower end of tubular seat 21 is exteriorly threaded at 21b for securement thereto of annular support 22 having a radially inwardly extending lower flange 22a. The radially inner edge of ring collar 20b is undercut to form a radial shoulder 20f against which annular support 22 abuts when the threaded connection between support 22 and valve seat 21 is fully tightened, thereby serving to hold these elements in assembled relationship and forcibly urging flange 21a into sealing relationship with the washer 20e. Extending completely longitudinally through valve seat 21 is a bore 21c having a radially outwardly flared upper end 21d and a radially enlarged lower end 21e.

Secondary valve member 15 comprises a tubular member 15a slidably received in bore 21c, having a closed outer end 15b and a radially outwardly enlarged lower end 15c, with an axial bore 15d extending from a point spaced from upper end 15b to open through the lower end. Apertures 15e through the wall of tubular member 15a immediately adjacent closed end 15b provide communication between bore 15d and chamber 17 when the rod member 15 is moved longitudinally upwardly to dispose the apertures upwardly of valve seat bore 21c. An O-ring 15f may be mounted around closed end 15b for sealing engagement with valve seat end 21d when the valve member 15 is in the lower or closed position as seen in Figure 2.

Extending downwardly from annular support 22 in axial alignment with valve member 15 is a tubular actuating member 23 having a radially outwardly extending flange 23a at its upper end carried on flange 22a of the annular support. Yieldable means are provided for urging valve member 15 to the valve closed position of Figure 2, herein disclosed as helical spring 24 concentrically carried around tubular member 15a in the radially enlarged lower end 21e of valve seat bore 21c to bear downwardly against the radially enlarged lower end 15c of the valve member, thereby forcing end 15c against flanged end 23a and urging the flange into abutment with flange 22a. As the pressure of the water on the upper side of valve member 15 tends to close the valve, spring 24 may be relatively light.

As best seen in Figures 1 and 2, manual operating means 16 comprises a rod 16a longitudinally reciprocable radially of actuating member 23 and extending through boss 10d to a point closely adjacent the actuating member. The means for effecting desired movement of rod 16a may be of any suitable form and is herein disclosed as a push button device 16b of conventional construction requiring no further description here. To maintain the valve-closed condition, the rod 16a is urged to the inoperative, outer position by a spring 16c which may be of relatively light construction allowing ready operation of the manual operating means 16.

An adjustable stop 12b is provided on closure 12 for limiting the upward movement of main valve member 13 and thereby adjusting the volume of chamber 17 displaced by such upward movement during the flushing operation of the valve. As will be more fully developed in the description of the operation of the valve, stop 12b acts to effect the positioning of check valve member 19f, further affecting the operating conditions. To prevent possible malfunctioning of the valve, it is preferred that the upward adjustment of stop 12b be limited to preclude upward movement of the movable valve members to a point where the lower end of actuating member is above rod 16a.

The operation of the valve is initiated by the manipulation of push button device 16b so as to urge rod 16a inwardly into contact with actuating member 23. This, as best seen in Figure 5, causes actuating member 23 to pivot about a point of contact between its flange 23a and flange 22a of the annular support 22 so that the diametric portion of flange 23a is displaced upwardly, resultingly upwardly displacing valve member 15a to effect communication between chamber 17 and valve member bore 15d through apertures 15e. The loose fit of member 15a in bore 21c allows a slight cocking thereof whereby O-ring 15f is initially cracked open at one point thereof only, thereby allowing a more ready opening of the pilot valve.

The resulting arrangement of the valve as seen in Figure 5 obtains only substantially instantaneously, for as soon as this communication is effected water in chamber 17 is allowed to pass therefrom downwardly through the bore 15d of the valve member and outwardly through outlet 11a. As the inlet water pressure is now acting primarily on the bottom surfaces only of the main valve member 13, the main valve member tends to move substantially instantaneously upwardly thereby quickly unseating portion 13b from valve seat 14 and allowing a relatively large flow of water directly from the inlet to the outlet. As long as rod 16a is displaced longitudinally inwardly, secondary valve member 15 is raised and maintained in the open position, water being delivered from chamber 17 to the outlet until the main valve member reaches the uppermost position as seen in Figure 6 and as determined by the setting of adjustable stop 12b.

During movement from the position of Figure 5 to that of Figure 6, control valve member 19f is urged upwardly, the pressure differential now existing between the inlet and chamber 17 causing a flow of water through passages 19n, bore 19h, around valve portion 19k through grooves 19o and into chamber 17. This flow, however, is relatively small as compared to the flow outwardly through apertures 15e so that it has little effect on the removal of the water from the chamber 17. Further, as the main valve member approaches the closure 12 the first element to abut stop 12b is rod portion 19m of the control valve member 19f which tends to move portion 19k from the upper position against bushing 19j thereby allowing a somewhat increased flow of water into chamber 17 and slowing the upward movement of the valve member down slightly. Concurrently with this operation of the control valve, the flow through apertures 15e is decreased by the action of the movement of annular support 22 upwardly relative to rod 16a causing the inward disposition of the rod to have decreasingly less efficacy in pivoting actuating member 23, and allowing actuating member 23 to return to the axially aligned position of Figure 6.

As best seen in Figure 6, when the main valve member 13 has reached the uppermost position as determined by the setting of stop 12b and manual operating means 16 is released to effect closure of the secondary valve member 15 the limited communication between chamber 17 and inlet 10a permits the water pressure at the inlet to be effective on both the top and bottom of the main valve member 13. Whatever slight pressure differential exists across the valve member 13 and the weight thereof act to move the valve member 13 relatively slowly downwardly and back to the seated position of Figure 2, with the relatively slow flow of water into chamber 17 through the restricted passages and around control valve member 19f serving to provide a substantial duration of the flush operation. Thus, it may be seen that a slight adjustment of stop 12b, because of the fact that it controls a relatively large cross sectional area, has a substantial effect on the effective volume of chamber 17 and serves as a positive control of the flush duration. When the main valve member 13 has returned to the position of Figure 2, chamber 17 is completely filled with water and the supply water pressure acting on the upper surface only of the main valve member forces it downwardly to seal tightly gasket 20d to valve seat 14, thereby effectively sealingly closing the valve.

Thus, it may be seen that through the operation of the relatively easily manipulatable secondary or pilot valve member 15 a relatively large flow of water is controlled through the flush valve. Because the secondary valve is carried by the main valve member a simple valve construction is obtained providing reduced manufacturing cost.

While I have shown and described one embodiment of the invention, it is to be understood that it is capable of many modifications. Changes, therefore, in the construction and arrangement may be made without departing from the spirit and scope of the invention as defined in the appended claims.

I claim:

1. In a flush valve having a main movable valve member reciprocably movable through a body member and defining with the body member a chamber having restricted communication with the inlet to the valve, a pilot valve means comprising: means associated with the main valve member defining a small passage between the chamber and the outlet from the valve; a first tube slidably received in said passage to extend longitudinally therethrough, said tube having a closed end in said chamber and a port through the wall of the tube proximate said closed end; spring means for urging said tube longitudinally to dispose the port within said passage; means for sealing said end to the passage defining means when the port is in said passage, thereby to close the passage and prevent communication between the chamber and the outlet; a second tube aligned with said first tube and having a first end abutting the other end of said first tube, said second tube being associated with the main valve member for angular axial displacement, with a portion of said first end of said second tube being moved toward said other end of the first tube by such displacement; and manually operable means on the body member for angularly displacing said second tube and moving said port into said chamber against the action of the spring means to open said passage.

2. In a flush valve having a main movable valve member reciprocably movable through a body member and defining with the body member a chamber having restricted communication with the inlet to the valve, a pilot valve means comprising: means associated with the main valve member defining a small passage between the chamber and the outlet from the valve; a first tube slidably received in said passage to extend longitudinally therethrough, said tube having a closed end in said chamber and a port through the wall of the tube proximate said closed end; spring means for urging said tube longitudinally to dispose the port within said passage; means for sealing said end to the passage defining means when the port is in said passage, thereby to close the passage and prevent communication between the chamber and the outlet; a second tube aligned with said first tube and having a first end provided with a radially outwardly extending flange abutting the other end of said first tube, said flange movably abutting the main valve member for angular axial displacement of said second tube relative to said first tube, the angular displacement occurring about a point of contact between said flange and said main valve member, with a portion of said first end of said second tube being moved toward said other end of the first tube by such displacement; and manually operable means on the body member for angularly displacing said second tube and moving said port into said chamber against the action of the spring means to open said passage.

3. In a flush valve having a main movable valve member reciprocably movable through a body member and defining with the body member a chamber having restricted communication with the inlet to the valve, a pilot valve means comprising: means associated with the main valve member defining a small downwardly extending passage between the chamber and the outlet from the valve; a first tube slidably received in said passage to extend longitudinally therethrough, said tube having a closed upper end in said chamber and a port through the wall of the tube proximate said closed end; spring means for urging said tube longitudinally to dispose the port within said passage; means for sealing said upper end to the passage defining means when the port is in said passage, thereby to close the passage and prevent communication between the chamber and the outlet; a second tube aligned with said first tube and having an upper end abutting the lower end of said first tube, said second tube being associated with the main valve member for angular axial displacement, with a portion of the upper end of said second tube being moved upwardly by such displacement; and manually operable means for controlling said pilot valve tubes, including a rod longitudinally reciprocable through the body member laterally of the axis of the second tube and having an inner end arranged to contact the second tube at a distance below said flange, and a push button device associated with the outer end of the rod, manually operable to urge said rod inner end against the second tube and effect angular axial displacement thereof sufficient to move a portion of said second tube upwardly against the lower end of said first tube to move said port from said small passage into said chamber thereby to open said small passage.

4. The pilot valve means of claim 1 wherein the means for sealing the closed end of the first tube to the passage defining means is an O-ring on said closed end, and said first tube has a loose fit in said passage whereby angular displacement of said second tube effects angular displacement of the first tube to crack open said means for sealing the closed end of the first tube upon initial operation of said manually operable means to open said passage.

References Cited in the file of this patent
UNITED STATES PATENTS

| | | |
|---|---|---|
| 1,511,891 | Knell | Oct. 14, 1924 |
| 1,849,129 | Wright | Mar. 15, 1932 |
| 2,136,221 | Sloan | Nov. 8, 1938 |
| 2,472,576 | Dorbrick | June 7, 1949 |